Jan. 21, 1958 W. A. REICH 2,820,663
MATERIAL ENGAGING HEAD FOR HOISTS OR THE LIKE
Filed Aug. 15, 1955 2 Sheets-Sheet 1
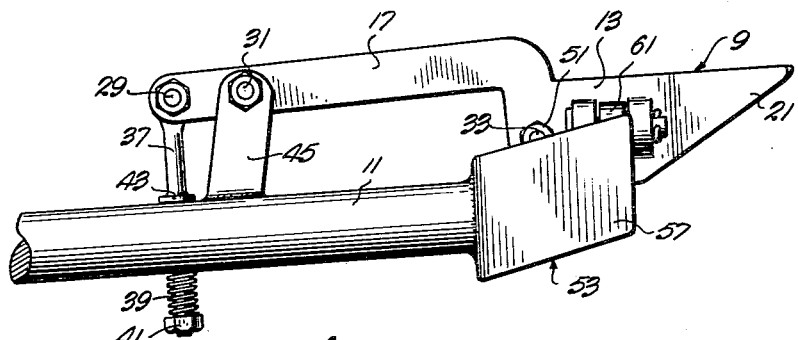
Fig. 1.
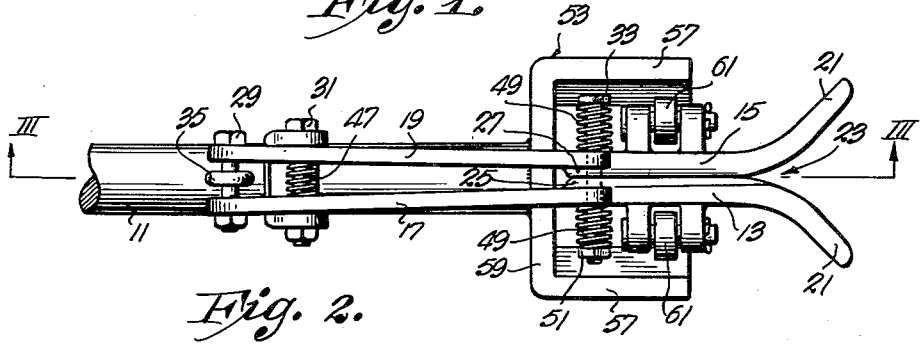
Fig. 2.
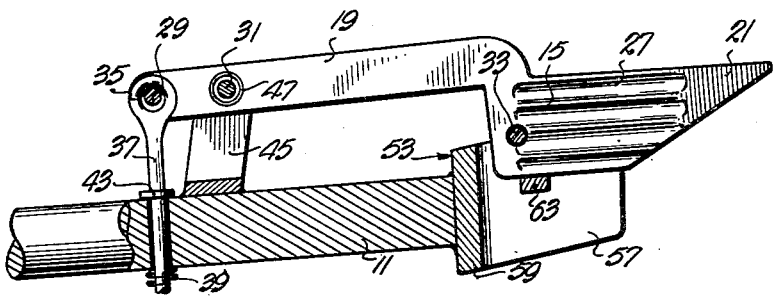
Fig. 3.
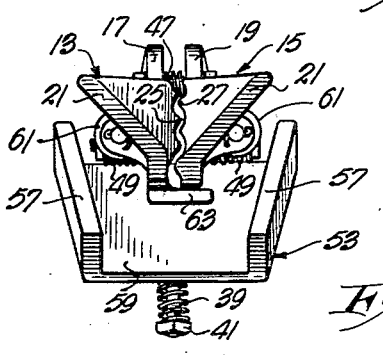
Fig. 4.
INVENTOR.
Walter A. Reich
BY 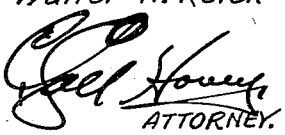
ATTORNEY.

Jan. 21, 1958 W. A. REICH 2,820,663
MATERIAL ENGAGING HEAD FOR HOISTS OR THE LIKE
Filed Aug. 15, 1955 2 Sheets-Sheet 2

INVENTOR.
Walter A. Reich
BY
ATTORNEY.

United States Patent Office 2,820,663
Patented Jan. 21, 1958

2,820,663

MATERIAL ENGAGING HEAD FOR HOISTS OR THE LIKE

Walter A. Reich, Kansas City, Mo., assignor to A. Reich & Sons, Inc., Kansas City, Mo., a corporation of Missouri Application August 15, 1955, Serial No. 528,384

9 Claims. (Cl. 294—106)

This invention relates to improvements in equipment for handling relatively heavy, bulky, unwieldy merchandise such as sides of beef and other meat cuts, banana bunches, and generally all articles that are conventionally suspended from ceiling hooks, overhead conveyors and the like through utilization of a rope.

It is the primary object of the instant invention to provide a head for hoists and other equipment, the head being equipped with cooperating jaw members so formed and disposed as to automatically grip a substantial portion of the length of the suspending rope so as to avoid the possibility of slippage.

Another object of the instant invention is to provide a head that has a pair of jaws carried by swingable links in a manner to maintain the jaws and, therefore, the longitudinal ribs on the proximal faces thereof in substantial parallelism so that the rope gripped therebetween is positively held against slippage.

A further object is to provide a head having the cooperating gripping jaws thereof so interconnected as to assure such parallel relationship between the ribs of the jaws.

Other objects include important details of construction such as the manner of arranging the longitudinal ribs of the jaws on an incline greater than the inclination of resilient bumper means to initiate movement of the jaws to a gripping position; the provision of an adjustment for effectively determining the distance between the ribs of the parallel jaws; the provision of roller means on the outer faces of the jaws for causing the same to clamp against a rope therebetween as the same are subjected to weight suspended therefrom; and the manner of normally maintaining the rollers ineffective.

In the drawings:

Figure 1 is a side elevational view of a material-engaging head for hoists or the like made pursuant to one form of my present invention.

Fig. 2 is a top plan view thereof.

Fig. 3 is a cross-sectional view taken on line III—III of Fig. 2.

Fig. 4 is an end view.

Figure 5:
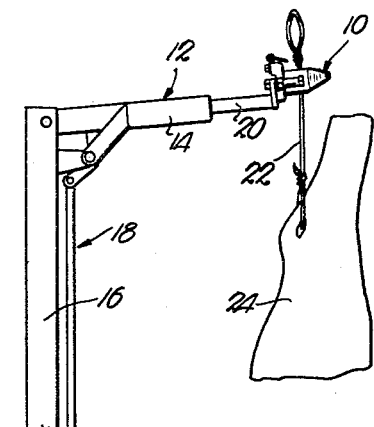
Fig. 5 is a side elevational view of a modified material-engaging head for hoists or the like made pursuant to the instant invention showing the same in operative use.
Figure 6:
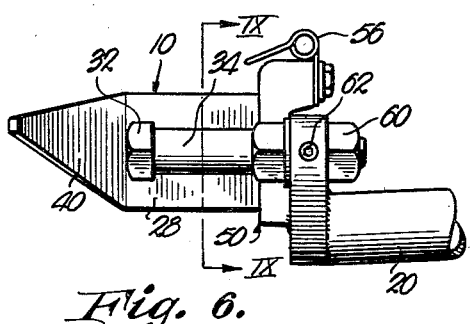
Fig. 6 is an enlarged, fragmentary, elevational view of the head of Fig. 5 showing the opposite face thereof.

This is a continuation-in-part of my copending application, Serial No. 428,530, filed May 10, 1954, now Patent No. 2,747,916 dated May 29, 1956.

In Figs. 1–4 of the drawings, a head 9 is shown mounted on an extension 11 of a swingable arm (not shown) for a mobile hoist. Head 9 is provided with a pair of substantially identical, elongated, plate-like jaws 13 and 15, mounted integrally on one end of corresponding links 17 and 19.

Jaws 13 and 15 are provided with outwardly-flared, substantially triangular wings 21, presenting an entrance mouth 23 for a rope or the like. A plurality of longitudinal gripping ribs 25 and 27 are formed on the inner faces of jaws 13 and 15 respectively, the ribs 25 being parallel with, but offset with respect to ribs 27, and it being noted that the ribs continue into the wings 21.

The jaws 13 and 15 should be provided with means to maintain the same in parallelism and to this end, in the embodiment illustrated by Figs. 1–4, they are interconnected for simultaneous movement through the medium of cross-bolts 29, 31 and 33.

Bolt 29 receives eye 35 of a pin 37, reciprocable in extension 11 and having a spring 39 coiled about its lowermost end. Nut 41 is provided on pin 37 to adjust the tension of spring 39 and a stop 43 on pin 37 limits its downward movement.

Bolt 31 serves to pivot links 17 and 19 to a U-shaped bracket 45 secured to extension 11 and a spring 47 is coiled about bolt 31 between links 17 and 19.

Bolt 33 is freely slidable in jaws 13 and 15 and has springs 49 coiled thereabout, the tensions whereof may be adjusted by take-up nut 51 on bolt 33.

The jaws 13 and 15 are confined within a cage 53 consisting of a pair of spaced, side flanges 57 integral with a back 59 and perpendicular thereto, back 59 being secured to extension 11.

Rollers 61 on the outer faces of jaws 13 and 15 are engageable with the relatively converging flanges 57, and a stop 63 on jaw 13, extending beneath jaw 15 limits the extent of inward movement of a rope therebetween.

The operation of head 9 can be best understood following an explanation of the embodiment of Figs. 5–10 of the drawings.

In Figure 5 of the drawings, there is illustrated one type of lifting and transporting apparatus with which head 10, forming the subject matter of another form of the instant invention, may be used. Hoist 12 chosen for illustration is provided with a vertically swingable arm 14 on an upright 16 controlled by suitable linkage 18. A tubular extension 20, rigid to the arm 14, carries the head 10 at the outermost end thereof.

Head 10 is adapted to grip a rope 22 for hanging heavy objects such as meat products 24, from ceilings, overhead conveyors and the like. To this end head 10 is provided with a pair of substantially identical, elongated plate-like jaws 26 and 28 that cooperate in gripping the rope 22 therebetween.

The rearmost face of a plate 30 is welded or otherwise fixed directly to the outer end of extension 20, whereas, the outermost face of the plate 30 receives the jaws 26—28 through the medium of bolts 32 perpendicular to the plate 30 and swingably mounting a pair of links 34. Bifurcated links 34 pivotally receive the jaws 26—28 through the medium of hinge barrels 36 rigid to the outer-faces of the jaws 26—28. Pintles 38 parallel with the bolts 32 swingably interconnect the jaws 26—28 with corresponding links 34.

Jaws 26—28 are provided with outwardly flared, substantially triangular wings 40, presenting an entrance mouth 42 for the rope 22. A plurality of longitudinal gripping ribs 44 and 46 are formed on the inner faces of jaws 26 and 28 respectively, the ribs 44 being parallel with, but offset with respect to the ribs 46, and it being noted that the ribs continue to the outermost extremities of the wings 40.

The jaws 26 and 28 should be provided with means to maintain the same in parallelism and to this end, in the embodiment illustrated by Figs. 5–10, they are interconnected for simultaneous movement through the medium of intermeshing cogs or teeth 48 on the innermost faces thereof next adjacent the outermost face of supporting plate 30, it being understood that the innermost ends of the ribs 44—46 terminate at the teeth 48.

The jaws 26 and 28 are confined within a cage 50 consisting of a pair of spaced, parallel, side flanges 52 and a bottom flange 54, all integral with a back 55 and perpendicular thereto, back 55 being secured to plate 30. A resilient bumper 56 mounted on the plate 30 at the uppermost end of the cage 50 within the path of travel of the jaws 26—28, may be made from any suitable spring material.

The distance between the innermost faces of the jaws 26—28 and, therefore, ribs 44—46, may be varied to accommodate ropes 22 of differing diameters and characteristics by virtue of the fact that plate 30 is provided with slots 58 receiving the bolts 32 and permitting movement thereof toward and away from each other. Opposed nuts 60 on bolts 32 permit clamping of the bolts 32 to the plate 30 in preselected positions and setscrews 62 carried by the plate 30 and extending into the slots 58, engage the bolts 32 to cooperate with the clamping nuts 60 in preventing outward movement of the bolts 32 away from each other.

Figure 7:
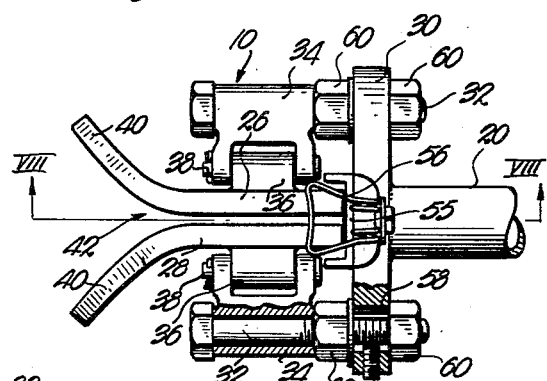
Fig. 7 is a fragmentary, top plan view, parts being broken away and in section for clearness.
Figure 9:
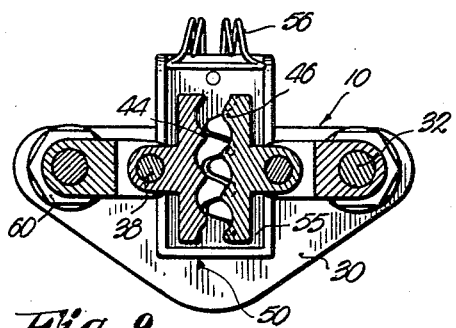
Fig. 9 is a cross-sectional view still further enlarged taken on line IX—IX of Fig. 6.
Figure 10:
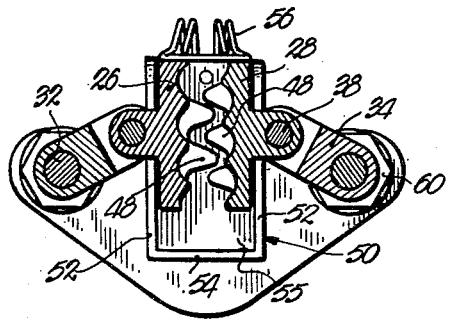
Fig. 10 is a view similar to Fig. 9 but illustrating the gripping jaws in a different position.
Figure 8:
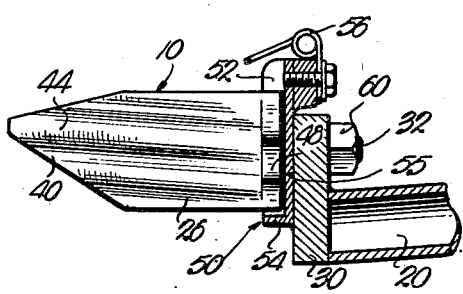
Fig. 8 is a cross-sectional view taken on line VIII—VIII of Fig. 7.

In order to effect a more satisfactory positive gripping action by ribs 44—46 on the rope 22, it is preferred that the said ribs be inclined upwardly and outwardly at a greater angle than the inclination of the bolts 32 and therefore, pintles 38, as best seen in Fig. 7. In other words, in normal use, the arm 14 of the hoist 12, is positioned substantially as shown in Fig. 5 of the drawing, whereby the extension 20 and the longitudinal axes of the bolts 32 incline upwardly and outwardly. When the head 10 is in such operative position, the angularity of the ribs 44—46 is still greater than that of the bolts 32. Consequently, as the hoist 12 is shifted to a position moving the mouth 42 into embracing relationship to the rope 22, the upward movement of the head 10 with respect to the rope 22, will tend to open the jaws 26—28 as rope 22 slides into the mouth 42 and along the ribs 44—46 between the jaws 26—28.

Assuming therefore, that the article 24 is hanging from a ceiling hook (not shown) by rope 22, the operator shifts the mobile hoist 12 to the position shown in Fig. 5 after first adjusting the arm 14 so as to align the head 10 with the rope 22 intermediate the ends thereof. At that time, the jaws 26—28 are closed as shown in Fig. 5 of the drawing, but as the head 10 is moved onto the rope 22, jaws 26—28 will move upwardly within the cage 50 and outwardly toward the flanges 52 and 54. Such movement of the jaws 26 and 28 is simultaneous by virtue of the intermeshing teeth 48 and such teeth, as well as the links 34, maintain the jaws 26 and 28 in parallelism at all times.

As the rope 22 raises the jaws 26 and 28 and approaches the support 30, rope 22 is held out of the teeth 48 by bumper 56, and the jaws 26—28 come into engagement with the bumper 56, which, by virtue of its resiliency, has the tendency of causing the jaws to snap inwardly and downwardly against the rope 22. Thereupon, arm 14 is swung upwardly and as the grip on the rope 22 progressively increases, the article 24 will be raised and the rope 22 may thereupon be released from the ceiling hook or other overlying support.

It can now be appreciated that inasmuch as the jaws 26 and 28 are always in parallelism, particularly when engaging the rope 22, all of the ribs 44 and 46 are effective in gripping the rope 22. In other words, rope 22 is kinked throughout that portion of the length thereof extending from the uppermost to the lowermost edges of the jaws 26 and 28. There is no mere line contact between the jaws and the rope and, therefore, since all of the ribs 44 and 46 cooperate in the gripping action, the tendency of slippage is virtually eliminated.

When the extension 11 of the head 9 is mounted on one end of arm 12, the same inclination is preferably maintained as hoist 12 is moved to a position where jaws 13—15 receive rope 22. However, in this form of the invention there is no need to lift the jaws 13—15 as the rope 22 enters between ribs 25—27. The slight tension of springs 49 is easily overcome and the rearmost ends of links 17—19 can slide toward each other on bolts 29 and 31 against the tension of spring 47.

As soon as the weight of article 24 on rope 22 is released, the jaws 15—17 swing downwardly within cage 53 about bolt 31 as a fulcrum and against the tension of spring 39. As rollers 61 move into engagement with flanges 57, the jaws 15—17 move together into progressively tighter gripping engagement with the rope 22. Stop 63 limits the extent of inward movement of the rope 22 and the jaws 15—17 are adapted to receive ropes of varying diameters.

Nut 41 should be adjusted to assure normal engagement of stop 43 with extension 11 so that jaws 15—17 may be spread to the maximum when at the uppermost ends of their paths of travel as shown in Fig. 1. Springs 49 should have sufficient tension to grip the rope as soon as inserted between ribs 25—27 and prior to rollers 61 engaging flanges 57, and of course, the size of the rope will govern to some extent the adjustment of nut 51.

It is to be noted that ribs 25 and 27 remain in substantial parallelism notwithstanding the extent to which jaws 15—17 are spread apart because of the length of links 15—17 and the distance between bolt 31 and jaws 15—17. Bolts 29 and 31 should pass through links 17—19 rather loosely and bolt 29 is free within eye 35 as seen in Fig. 3, which figure also shows the looseness of bolt 33 in jaws 15—17, and pin 37 in extension 11.

Having thus described the invention what is claimed as new and desired to be secured by Letters Patent is:

1. In a head of the kind described, a support; a pair of spaced links; bolts mounting the links on one face of the support for swinging movement on parallel axes normally inclined upwardly and outwardly from said face of the support; a pair of opposed, cooperable gripping jaws; means for each jaw respectively pivotally mounting the same on a corresponding link for swinging movement relative thereto on axes parallel with the axes of swinging movement of the links; means interlocking the jaws for maintaining the same in parallelism during swinging of the links; an outwardly flared, substantially triangular wing integral with the outermost end of each jaw respectively remote from said face of the support, presenting an entrance mouth; a plurality of elongated gripping ribs on the proximal, innermost faces of the jaws and the wings, the ribs of one jaw being parallel with and offset relative to the ribs of the other jaw, the longitudinal axes of the ribs being normally inclined upwardly and outwardly from said face of the support at an angle greater than the angle of inclination of said axes of the links, said support having bolt-receiving slots clearing the bolts for movement toward and away from each other; a guide cage for said jaws on said face of the support; including a pair of spaced, parallel side flanges and a bottom flange, the innermost ends of the jaws extending into the cage; and a resilient bumper mounted on the support at the uppermost end of the cage within the path of travel of the jaws.

2. In a head of the kind described, a support; a pair of spaced links; bolts mounting the links on one face of the support for swinging movement on parallel axes normally inclined upwardly and outwardly from said face of the support; a pair of opposed, cooperable gripping jaws; means for each jaw respectively pivotally mounting the same on a corresponding link for swinging movement relative thereto on axes parallel with the axes of swinging movement of the links; means interlocking the jaws for maintaining the same in parallelism during swinging of the links; an outwardly flared, substantially triangular wing integral with the outermost end of each jaw respectively remote from said face of the support, presenting an entrance mouth; a plurality of elongated gripping ribs on the proximal, innermost faces of the jaws and the wings, the ribs of one jaw being parallel with and offset relative to the ribs of the other jaw, the longitudinal axes of the ribs being normally inclined upwardly and outwardly from said face of the support at an angle greater than the angle of inclination of said axes of the links, said support having bolt-receiving slots clearing the bolts for movement toward and away from each other; set screws mounted on the support, extending into the slots, and bearing against the bolts for holding the same against movement away from each other; a guide cage for said jaws on said face of the support, including a pair of spaced, parallel side flanges and a bottom flange, the innermost ends of the jaws extending into the cage; and a resilient bumper mounted on the support at the uppermost end of the cage within the path of travel of the jaws.

3. In a head of the kind described, a support; a pair of spaced links; means mounting the links on the support for swinging movement on parallel axes; a pair of opposed, cooperable gripping jaws adapted to receive a rope or the like therebetween; means for each jaw respectively pivotally mounting the same on a corresponding link for swinging movement relative thereto on axes parallel with the axes of swinging movement of the links; means for maintaining the jaws in parallelism during swinging of the links; and a resilient bumper mounted on the support above the jaws within the path of travel thereof and disposed to limit the extent of movement of the rope toward the support.

4. In a head of the kind described, a support; a pair of spaced links; means mounting the links on the support for swinging movement on parallel axes; a pair of opposed, cooperable gripping jaws adapted to receive a rope or the like therebetween; means for each jaw respectively pivotally mounting the same on a corresponding link for swinging movement relative thereto on axes parallel with the axes of swinging movement of the links; interlocking teeth on said jaws adjacent said support for maintaining the jaws in parallelism during swinging of the links; and a resilient bumper mounted on the support above the jaws within the path of travel thereof and disposed to prevent movement of the rope into said teeth.

5. In a head of the kind described, a support; a pair of elongated links; a gripping jaw on one end of each link respectively; pivot means on the support mounting the links thereon for swinging movement on a common axis and movement of the jaws toward and away from each other; and jaw engaging means carried by the support and disposed to drive the jaws toward each other as the links and jaws swing in one direction on said axis.

6. In a head of the kind described, a support; a pair of elongated links; a gripping jaw on one end of each link respectively; pivot means on the support mounting the links thereon for swinging movement on a common axis and movement of the jaws toward and away from each other; jaw engaging means carried by the support and disposed to drive the jaws toward each other as the links and jaws swing in one direction on said axis; and resilient means carried by the jaws and engaging the latter for yieldably biasing the same toward each other.

7. In a head of the kind described, a support; a pair of elongated links; a gripping jaw on one end of each link respectively; pivot means on the support mounting the links thereon for swinging movement on a common axis and movement of the jaws toward and away from each other; jaw engaging means carried by the support and disposed to drive the jaws toward each other as the links and jaws swing in one direction on said axis; and stop means carried by the links and engageable with the support for limiting the extent of swinging movement of the links and jaws in the opposite direction.

8. In a head of the kind described, a support; a pair of elongated links; a gripping jaw on one end of each link respectively; pivot means on the support mounting the links thereon for swinging movement on a common axis and movement of the jaws toward and away from each other; jaw-engaging means carried by the support and disposed to force the jaws toward each other as the links and jaws swing in one direction on said axis; and resilient means carried by the links and engaging the support for yieldingly biasing the links and jaws in the opposite direction.

9. In a head of the kind described, a support; a pair of elongated links; a gripping jaw on one end of each link respectively; pivot means on the support mounting the links thereon for swinging movement on a common axis and movement of the jaws toward and away from each other; jaw-engaging means carried by the support and disposed to force the jaws toward each other as the links and jaws swing in one direction on said axis; resilient means carried by the links and engaging the support for yieldingly biasing the links and jaws in the opposite direction; resilient means carried by the jaws and engaging the latter for yieldingly biasing the same toward each other; and stop means carried by the links and engageable with the support for limiting the extent of swinging movement of the links and jaws in said opposite direction.

References Cited in the file of this patent

UNITED STATES PATENTS

| | | |
|---|---|---|
| 1,510,176 | Knight | Sept. 30, 1924 |
| 1,581,959 | Kinch | Apr. 20, 1926 |
| 1,635,622 | Henderson | July 12, 1927 |
| 1,749,869 | Baumbach | Mar. 11, 1930 |
| 2,536,932 | Heppenstall | Jan. 5, 1951 |
| 2,573,064 | Robson | Oct. 30, 1951 |